June 29, 1937.    H. RUCK    2,085,451
WIND ACTUATED ADVERTISING DEVICE
Filed April 21, 1937
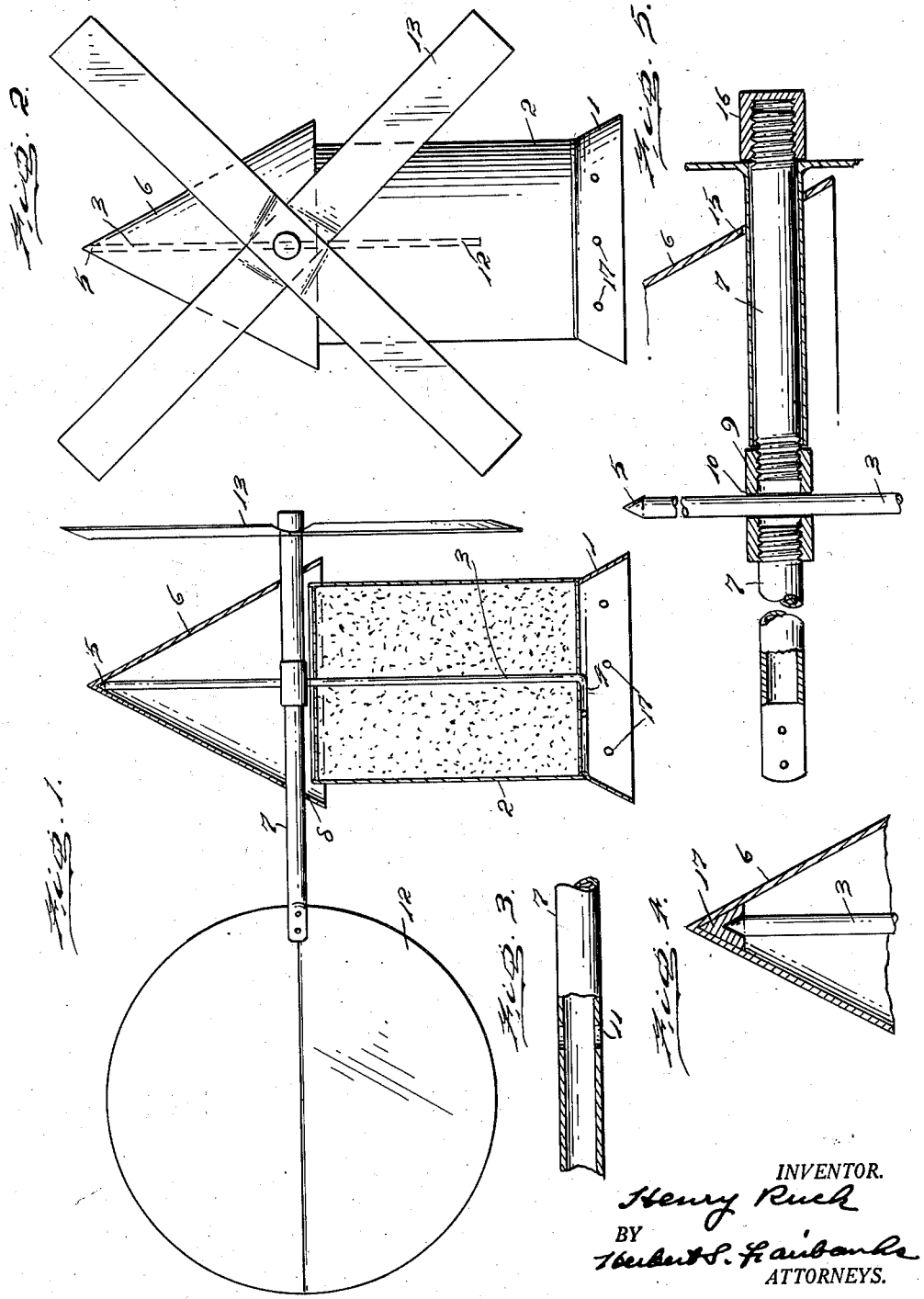
INVENTOR.
Henry Ruck
BY
Herbert S. Fairbanks
ATTORNEYS.

Patented June 29, 1937

2,085,451

UNITED STATES PATENT OFFICE 2,085,451

WIND ACTUATED ADVERTISING DEVICE

Henry Ruck, Philadelphia, Pa.

Application April 21, 1937, Serial No. 138,153

3 Claims. (Cl. 40—39)

The object of this invention is to devise a novel wind driven device which can be economically manufactured from scrap material, and which, if desired, can have indicated on its various parts, advertising matter.

A further object of the invention is to utilize waste cans such as those used for dispensing motor oils and greases.

With the above and other objects in view as will hereinafter appear, my invention comprehends a novel wind actuated advertising device.

It further comprehends a novel body portion and a novel vane mounted in a novel manner.

Other novel features of construction and advantage will hereinafter clearly appear in the detailed description and the appended claims.

For the purpose of illustrating the invention, I have shown in the accompanying drawing preferred embodiments of it, which, in practice, will give satisfactory and reliable results. It is, however, to be understood that these embodiments are typical only and the various instrumentalities of which my invention consists can be variously arranged and organized, and the invention is not limited to the exact arrangement and organization of these instrumentalities as herein set forth.

Figure 1 is a sectional elevation of a wind driven device, embodying my invention.

Figure 2 is an elevation.

Figure 3 is a sectional detail of a shaft.

Figure 4 is an enlarged sectional view showing more particularly the pivot mounting.

Figure 5 is an enlarged sectional detail of the vane shaft and the mounting for the wind driven arms.

Similar numerals indicate corresponding parts.

Referring to the drawing:

1 designates the base of a wind driven device, embodying my invention, many parts of which may be made of waste cans. The base 1 is open at its bottom and is in the form of a flared ring, soldered or otherwise connected with a body portion or can 2 which is filled with sand or other cheap material to give it weight and stability. The can is closed at its top but may have a filling opening. A rod 3 extends vertically through the can and its lower end is bent laterally and soldered or spot welded to the can bottom. The rod 3 at its upper end is convex as at 5 to form a bearing for a cone 6, the lower wall of which overhangs the can to act as a water shed.

A shaft 7, preferably tubular, extends through the cone and is soldered at 8 thereto. The shaft may be sectional with the sections connected by a union 9 apertured at 10 to permit the rod 3 to pass therethrough as in Figure 5, or the shaft may be in one piece as in Figure 3, and have an aperture 11 to receive the rod 3. The shaft 7 is split at one end to receive a vane 12. The wind wheel 13 consists of a number of blades secured to a hub which latter is connected with a sleeve 14 through which the shaft 7 extends, the hole 15 in the cone 6 providing a clearance for the revolution of the sleeve, a cap nut 16 in threaded engagement with the end of the shaft 7 retaining the sleeve in assembled relation with the shaft.

In some cases, it is advantageous to employ a hardened or wear resistant bearing 17 within the cone as seen in Figure 4.

When the wind blows, the arms of the wind wheel revolve, thus attracting attention to the advertising material of the cans, base, cone, vanes or arms, and the vane 12 brings the wind wheel into the wind in the conventional manner.

The waste can with the advertising originally on it may be used for the body portion 2, and other waste cans can be cut to form sections of the vane, the cone, base and wind wheel.

My device can therefore be very economically manufactured from scrap or waste material, and the parts not carrying advertising material are painted or enamelled in the same or contrasting colors to provide an attractive appearance.

The base 1 may be provided with a plurality of holes 17, adapted to receive fastening means such as wires.

The wind wheel may also be provided with ball, or anti-friction bearings if desired.

Having thus described my invention, what I claim as new and desire to secure by Letters Patent is:

1. In a device of the character described, comprising a body portion in the form of a can having a filling to increase its weight, a rod passing through and secured to the can, a cone pivotally supported on the rod, a shaft secured to and passing through the cone and having means to receive the rod, a vane on the shaft, and a wind wheel mounted to revolve on the shaft.

2. In a device of the character described, comprising a body portion in the form of a can having a filling to increase its weight, a rod passing through and secured to the can, a cone pivotally supported on the rod and overhanging the can, a shaft secured to and passing through the cone and having means to receive the rod, a vane on the shaft, and a wind wheel mounted to revolve on the shaft.

3. In a device of the character described, comprising a body portion in the form of a can having a filling to increase its weight, a rod passing through and secured to the can, a sheet metal cone having a wear resistant bearing pivotally supported on the rod, a shaft secured to and passing through the cone and having means to receive the rod, a vane on the shaft, and a wind wheel mounted to revolve on the shaft.

HENRY RUCK.